US008763109B2

(12) United States Patent  
Killian et al.

(10) Patent No.: US 8,763,109 B2
(45) Date of Patent: *Jun. 24, 2014

(54) SEAMLESS DATA NETWORKING

(71) Applicant: AT&T Intellectual Property I, L.P., Atlanta, GA (US)

(72) Inventors: Thomas J. Killian, Westfield, NJ (US); Christopher W. Rice, Parsippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/687,963

(22) Filed: Nov. 28, 2012

(65) Prior Publication Data

US 2013/0091560 A1  Apr. 11, 2013

Related U.S. Application Data

(63) Continuation of application No. 12/272,439, filed on Nov. 17, 2008, now Pat. No. 8,359,644.

(51) Int. Cl.
*G06F 9/00* (2006.01)

(52) U.S. Cl.
USPC .......................................................... 726/15

(58) Field of Classification Search
USPC .......................................................... 726/15
See application file for complete search history.

(56) References Cited

U.S. PATENT DOCUMENTS

| 5,940,394 | A | 8/1999 | Killian |
| 6,061,346 | A | 5/2000 | Nordman |
| 6,473,426 | B1 | 10/2002 | Killian |
| 6,751,441 | B1 | 6/2004 | Murray et al. |
| 6,795,709 | B2 | 9/2004 | Agrawal et al. |
| 6,804,720 | B1 | 10/2004 | Vilander et al. |
| 6,990,339 | B2 | 1/2006 | Turanyi et al. |
| 7,103,347 | B2 | 9/2006 | Chow et al. |
| 7,184,418 | B1 | 2/2007 | Baba et al. |
| 7,450,595 | B1 | 11/2008 | Killian |
| 7,477,648 | B2 | 1/2009 | Ota et al. |
| 7,542,468 | B1 | 6/2009 | Begley et al. |
| 7,561,555 | B2 | 7/2009 | Abrol et al. |
| 7,567,804 | B1 | 7/2009 | Mangal |
| 7,627,679 | B1 | 12/2009 | Bowen |
| 7,827,292 | B2 * | 11/2010 | Chen et al. .................... 709/229 |
| 7,984,293 | B2 * | 7/2011 | Winslow ....................... 713/162 |
| 2003/0028650 | A1 | 2/2003 | Chen et al. |
| 2003/0058827 | A1 | 3/2003 | Chow et al. |
| 2003/0152068 | A1 * | 8/2003 | Balasaygun et al. .......... 370/356 |
| 2003/0200321 | A1 | 10/2003 | Chen et al. |
| 2004/0053600 | A1 | 3/2004 | Chow et al. |
| 2004/0246957 | A1 | 12/2004 | Grimminger |
| 2005/0041797 | A1 | 2/2005 | Bellovin et al. |
| 2005/0281277 | A1 | 12/2005 | Killian |
| 2006/0014511 | A1 | 1/2006 | Ghassemzadeh et al. |
| 2006/0056445 | A1 | 3/2006 | Lin |
| 2006/0062228 | A1 | 3/2006 | Ota et al. |

(Continued)

*Primary Examiner* — Teshome Hailu
(74) *Attorney, Agent, or Firm* — Scott P. Zimmerman, PLLC

(57) ABSTRACT

A roaming client in communication with an enterprise site through a virtual private network (VPN) gateway maintains an address for a virtual network interface upon becoming a resident client at the enterprise site. A physical interface for the resident includes two valid addresses. Seamless data networking is achieved while promoting routing efficiency by reducing the amount of local traffic addressed to and from the virtual address that is unnecessarily routed through VPN gateways.

18 Claims, 3 Drawing Sheets

(56) References Cited

U.S. PATENT DOCUMENTS

| | | |
|---|---|---|
| 2006/0072585 A1 | 4/2006 | Hung |
| 2006/0080441 A1 | 4/2006 | Chen et al. |
| 2006/0104262 A1 | 5/2006 | Kant et al. |
| 2006/0153124 A1 | 7/2006 | Kant et al. |
| 2007/0081519 A1 | 4/2007 | Ramaswamy et al. |
| 2007/0280154 A1 | 12/2007 | Gupta et al. |
| 2007/0293263 A1 | 12/2007 | Eslambolchi et al. |
| 2008/0031215 A1 | 2/2008 | Joung et al. |
| 2008/0046597 A1 | 2/2008 | Stademann et al. |
| 2008/0075055 A1 | 3/2008 | Chow et al. |
| 2008/0081557 A1 | 4/2008 | Murray et al. |
| 2008/0130637 A1 | 6/2008 | Kant et al. |
| 2008/0159533 A1 | 7/2008 | Schryer et al. |
| 2008/0219162 A1 | 9/2008 | Akyol |
| 2008/0279112 A1 | 11/2008 | Schryer et al. |
| 2009/0034536 A1 | 2/2009 | Morand et al. |
| 2009/0052398 A1 | 2/2009 | Hormann |
| 2009/0052414 A1 | 2/2009 | Senga et al. |
| 2009/0060182 A1 | 3/2009 | Killian |
| 2009/0067442 A1 | 3/2009 | Killian |
| 2009/0133115 A1* | 5/2009 | Heninger et al. ............... 726/15 |
| 2009/0201878 A1 | 8/2009 | Kotecha et al. |
| 2009/0207757 A1 | 8/2009 | Andreasen et al. |
| 2009/0207759 A1 | 8/2009 | Andreasen et al. |
| 2009/0213808 A1 | 8/2009 | Boehm et al. |
| 2009/0245150 A1 | 10/2009 | Tsao |
| 2010/0067407 A1 | 3/2010 | Bowen et al. |

* cited by examiner

SEAMLESS DATA NETWORKING

This patent application is a continuation of U.S. patent application Ser. No. 12/272,439, filed Nov. 17, 2008, now issued as U.S. Pat. No. 8,359,644, the entirety of which is hereby incorporated by reference.

BACKGROUND

1. Field of the Disclosure

The present disclosure generally relates to packet switched networks, and more specifically, to systems for routing packet traffic.

2. Description of the Related Art

Communication between a roaming (i.e., remote) client and local network elements within an enterprise site (e.g., a company site) may be established through Virtual Private Network (VPN) services that use a Multi-Protocol Label Switching (MPLS) domain. If the roaming client becomes a resident (i.e., local) client with a physical connection at the enterprise site, continued use of addresses used by the VPN services may result.

DESCRIPTION OF THE EMBODIMENT(S)

Figure 1:
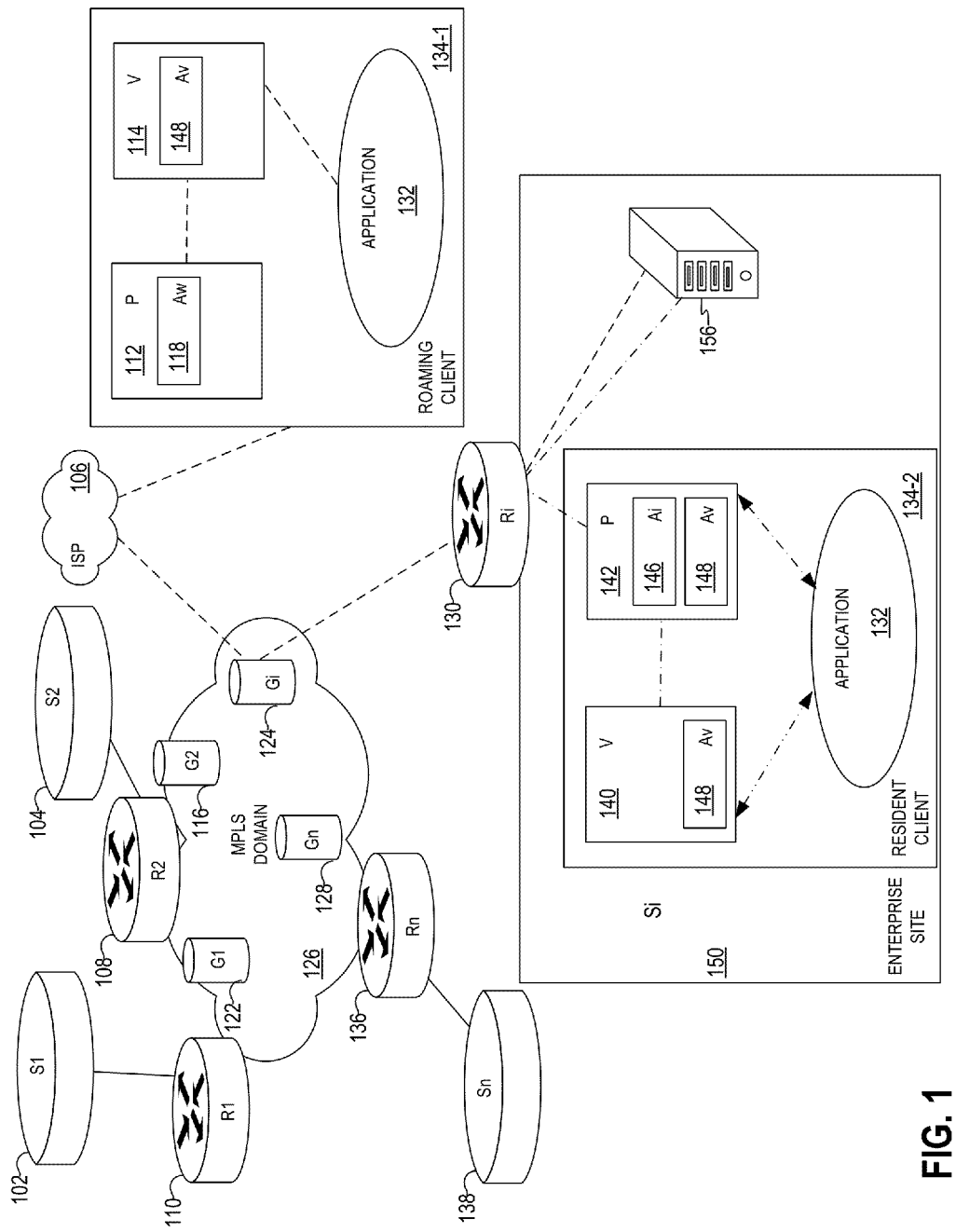
FIG. 1 illustrates a representative network architecture in which seamless data networking occurs by permitting a roaming client to use its virtual address after it becomes a resident client.

Mobile clients on non-secure (e.g., public) access networks often require secure connectivity to restricted resources within an enterprise site. For example, employees may take a company-owned laptop computer home and gain access to the company's network, including access to corporate email servers and sensitive corporate databases over an Internet connection provided by a public Internet service provider (ISP). Virtual Private Network (VPN) services provide such secure connectivity by giving a client an Internet protocol (IP) address on a virtual network interface and encrypting all data that passes through this interface. The encrypted traffic goes to a secure VPN gateway, where it is decrypted and forwarded securely within the secure (e.g., corporate) network. IP sessions over the VPN can be seamless. In other words, as the client moves from one access network to another, software can migrate the VPN connection from one access address to another, while the client's virtual address stays unchanged. Traditionally, this solution may be inefficient if the client gains access to the secure network while maintaining the VPN connection.

An exemplary scenario is a client that has Internet access through a coffee shop's network, which is utilized for establishing a VPN connection, through a VPN gateway, between the client and a corporate network. If the client leaves the coffee shop and establishes a physical connection with the corporate network (i.e., a physical connection at the corporate site), the client's traffic may hairpin (i.e., be routed) through what has become a superfluous VPN gateway. In many cases, such routing of traffic through the unnecessary VPN gateway adds delay and increases the load on the local access link. The client can easily close the VPN connection and use the local corporate access network exclusively, but this would mean dropping the VPN address in favor of the local access address, at which point any active IP sessions would be dropped as well.

In contrast, disclosed systems allow a client (e.g., an application on a laptop computer) to maintain secure, seamless, and efficient IP connectivity using the same IP address as the client migrates from one access network to another. Traditional VPNs provide security and seamlessness, but may create inefficiencies when a client migrates to a secure access network (e.g., a corporate premises) and connects to servers on the network. Traffic sent to and from virtual addresses established during a VPN session often must hairpin through a possibly distant VPN gateway which is inefficient. Alternatively, in traditional systems, a client must reestablish a new connection once the client migrates from an external access network to a secure access network.

In one aspect, a disclosed method includes establishing a virtual interface and a corresponding virtual address for a client to enable the client to access an entity's secure network via a non-secure access network. The client, which is a roaming client, has a first physical interface and a corresponding first physical address for communicating via the non-secure access network. The method further includes detecting that the client has established a second physical interface and a corresponding second physical address for communicating via a second access network. A determination is made whether the second physical address is a secure address within the entity's secure network. If the second physical address is a secure address within the entity's secure network, the virtual address is established as a recognized address within at least a portion of the secure network. As a result, network traffic originating from the virtual address is routed to avoid the VPN gateway while the second physical address remains valid.

In another aspect, a disclosed gateway includes a processor that executes instructions for establishing for a client a virtual interface and a corresponding virtual address. The client has a first physical interface and a first physical address associated with a non-secure access network. The virtual interface enables the client to access resources on an entity's secure network via an edge router for the entity. Further instructions detect when the client establishes a second physical interface and a corresponding second physical address associated with a second access network. If the second physical address includes a secure address within the secure network, the edge router for the entity is informed to recognize the virtual address as a local address. As a result, network traffic originating from and addressed to the virtual address is routed to avoid the gateway when possible and while the second physical address remains valid.

In still another aspect, a disclosed computer program product stored on at least one tangible computer readable medium includes instructions for detecting if a physical address associated with the client is a local address within a secure network, establishing a virtual address for the client as a recognized address within the secure network, and sending a first packet from the virtual address to its destination via a route that avoids the VPN gateway.

In the following description, examples are set forth with sufficient detail to enable one of ordinary skill in the art to practice the disclosed subject matter without undue experimentation. It should be apparent to a person of ordinary skill that the disclosed examples are not exhaustive of all possible embodiments. Regarding reference numerals used to describe elements in the figures, a hyphenated form of a reference numeral typically refers to a specific instance of an element and an un-hyphenated form of the reference numeral typically refers to the element generically or collectively. Thus, for example, element 134-1 refers to an instance of a client as a roaming client and element 134-2 refers to the same client as a resident client. The client, whether as a roaming client, a resident client, or both, may be referred to collectively as clients 134 and any one of which may be referred to generically as a client 134. Before describing other details of embodied methods systems, and devices, selected aspects of data networks that provide VPN services are described to provide further context.

Reference is now made to the figures. As shown in FIG. 1, corporate sites 102, 104, and 138 (i.e., S1, S2, . . . Sn) are served by access routers 110, 108, and 136 (i.e., R1, R2, . . . Rn), respectively. The corporate sites 102, 104, and 138 (i.e., corporate site Si) each maintain a physical address space with local addresses (e.g., Ai) and use virtual addresses (e.g., Av) for VPN services. The VPN gateways 122, 116, and 128 (i.e., G1, G2, . . . , Gn) manage at least one VPN IP address space, including the virtual address Av for example, that is disjointed from physical addresses (e.g., Ai). As shown, VPN gateways 122, 116, and 128 provide enterprise site 150 with secure connectivity to access routers 110, 108, and 136 (i.e., R1, R2, . . . Rn) using MPLS domain 126 (e.g., through MPLS tunnels). VPN gateway 124 (i.e., Gi) similarly provides secure connectivity to elements at enterprise site 150 through access router 130 (i.e., Ri) over one or more MPLS tunnels. Although not depicted, secure connectivity may be provided through alternative means, including the use of dedicated physical links, Internet Protocol Security (IPSec) tunnels, Layer 2 Tunneling Protocol (L2TP), and the like. As shown, resident client 134-2 has a local physical interface 142, which may include multiple physical IP interfaces enabled for Ethernet, WiFi, EDGE, and the like. As shown, local physical interface 142 has local address 146 (i.e., Ai) and virtual address 148 (i.e., Av). In addition, resident client 134-2 includes virtual IP interface 140 (i.e., V) that may communicate through one or more VPN tunnels using virtual address 148 (i.e., Av).

As shown in FIG. 1, roaming client 134-1 depicts resident client 134-2 when it is remote from enterprise site 150. In this configuration, application 132 on roaming client 134-1 communicates using VPN services through ISP 106 to server 156, for example, using physical interface 112 which has address 118 (i.e., Aw). As shown, address 118 is "Aw," in which "w" indicates wild (i.e., insecure). Roaming client 134-1 establishes a VPN tunnel with gateway 124 (i.e., Gi) and is assigned address 148 (i.e., Av) for its interface 114. Accordingly, roaming client 134-1 uses address 148 (i.e., Av) to establish IP sessions with servers (e.g., server 156) at sites (e.g., Si, S1, S2, . . . , Sn). As roaming client 134-1 moves from one access network to another, roaming client 134-1 may establish a different address 118 for interface 112. Accordingly, roaming client 134-1 may negotiate new tunnels or maintain its existing tunnel active using certain protocols (e.g., Mobility and Multihoming Working Group (MobIKE) protocol). In either case, virtual interface 114 keeps address 148 as Av, and IP sessions associated with address 148 are unaffected.

Roaming client 134-1 may change its status to resident client 134-2 if a user establishes a local physical connection at enterprise site 150. Accordingly, if resident client 134-2 establishes a physical address 146 (i.e., Ai) at enterprise site 150 (i.e., Si), resident client 134-2 may realize that it has a valid corporate address. This realization may be, for example, because: (1) the Dynamic Host Configuration Protocol (DHCP) lease for address 146 (i.e., Ai) contains an assertion to this effect; (2) resident client 134-2 has a list of valid corporate addresses; or (3) if address 146 (i.e., Ai) is in use to communicate with VPN gateway 124 (i.e., Gi), then gateway 124 (i.e., Gi) may inform resident client 134-2 of the "local" status of address 146.

In some embodiments, resident client 134-2 informs gateway 124 (i.e., Gi) of any new DHCP lease. In turn, gateway 124 (i.e., Gi) then knows if the assigned address belongs to a particular site (e.g., enterprise site 150, which is Si). Gateway 124 checks that the route for traffic addressed to address 146 (i.e., Ai) is through a secure MPLS tunnel. In turn, resident client 134-2 informs gateway 124 that it wishes to use address 148 (i.e., Av) directly on physical interface 142 which was assigned address 146 (i.e., Ai). In this case, physical interface 142 has two physical addresses 146 and 148 (i.e., Ai and Av). For security, gateway 124 may send an acknowledgement (e.g., ACK1) to address 146. This ACK1 passes through router 130 (i.e., Ri), so that if resident client 134-2 is on a spoofed network, the ACK1 will not be received by the hacking client.

As shown in FIG. 1, resident client 134-2 is properly connected within enterprise site 150, so resident client 134-2 receives the ACK1 and sends a route-change request (e.g., REQ) to gateway 124 (i.e., Gi). In turn, gateway 124 receives the request, sends a second acknowledgement (e.g., ACK2) to resident client 134-2, and sends a routing message to router 130 (i.e., Ri) that indicates that address 148 (i.e., Av) can be accessed on router 130's (i.e., Ri's) local area network (LAN) within corporate site 150. Resident client 134-2 receives the ACK2 and assigns address 148 (i.e., Av) to physical interface 142 (i.e., P) that was also assigned address 146 (i.e., Ai). Physical interface 142 then has two valid IP addresses 146 and 148, which correspond to Ai and Av, respectively. In this way, resident client 134-2 continues to use the same address 148 (i.e., Av) that it had as roaming client 134-1; however resident client 134-2's traffic sent and received within enterprise site 150 will be routed to avoid VPN gateways such as gateway 124. In this way, disclosed embodiments help prevent excess loads from being placed on enterprise site 150's access link.

If resident client 134-2 loses address 146 (i.e., Ai) and gets some other access address (e.g., address 118, or Aw), then resident client 134-2 may re-establish the VPN tunnel with gateway 124 (i.e., Gi), causing gateway 124 to inform router 130 (i.e., Ri) that gateway 124 is once again the router for address 148 (i.e., Av). To reduce latency, resident client 134 may maintain its tunnel at all times, regardless of whether or not it is handling traffic. In this case, resident client 134's traffic with servers external to enterprise site 150 continues to pass through gateway 124. In an alternative embodiment, once roaming client 134-1 changes its status to resident client 134-2, gateway 124 broadcasts a message to other corporate sites and other routers that router 130 is the router for address 148. In this case, all traffic destined for address 148, not only that originating at enterprise site 150, will go to router 130 (i.e., Ri). If this broadcast mechanism is available, VPN gateways (e.g., gateway 124) may also use it, in combination with VPN control messages, to migrate roaming client 134-1 from gateway 124 to another gateway to keep roaming client 134-1 connected to the gateway closest to roaming client 134-1's then current access network.

As shown in FIG. 1, client application 132 runs on roaming client 134-1 that may implement embodiments of the present disclosure to allow seamless networking by moving a VPN address into a local LAN environment without ending services that use the VPN address. As shown, roaming client 134-1 and resident client 134-2 are two instances of the same client machine (e.g., a data processing system). Roaming client 134-1 has a physical network interface 112 (e.g., Ethernet, Edge, or 802.11) that connects to an enterprise network element (e.g., server 156) through ISP 106. As shown, roaming client 134-1 receives an address 118 (i.e., Aw) from ISP 106. Application 132 sees virtual network interface 114, which gets an address 148 (i.e., Av) and a VPN gateway (e.g., gateway 124) that sits inside the MPLS domain 126. If application 132 wants to communicate with server 156 on enterprise site 150, it first communicates with virtual network interface 114, which encapsulates packets and sends them to physical interface 112. The packets then go through ISP 106 and through gateway 124. In turn, the packets go through MPLS domain 126, through router 130, and on to server 156. Any data packets sent from server 156 to application 132 may follow the opposite path. In this way, roaming client 134-1 communicates with server 156 using VPN services.

In the above example, roaming client 134-1 may be used, for example, by an employee on a laptop computer at the employee's home. If the employee drives to work (i.e., enterprise site 150) and uses the same laptop computer in the employee's office, roaming client 134-1 would change its status to resident client 134-2. In many cases, it would likely be burdensome to the employee to tear down all transmission control protocol (TCP) connections with server 156 once the employee arrived at work. However, when using some traditional routing techniques, without reestablishing all TCP connections, traffic addressed to application 132 from server 156 (i.e., local traffic) traverses router 130, goes to gateway 124, hairpins back to router 130, and is forwarded to application 132 in resident client 134-2. Once resident client 134-2 establishes a physical address within enterprise site 150, it becomes unnecessary for traffic sent and received within enterprise site 150 to enter MPLS domain 126. Therefore, in the above example, it is unnecessary for traffic sent locally from server 156 and received locally to be processed by gateway 124 within MPLS domain 126.

There are various techniques that can be used to determine when roaming client 134-1 changes its status to resident client 134-2. The client 134 may make the determination, ISP 106 may make the determination, or other network components may make the determination, as examples. When roaming client 134-1 is roaming, management software such as a DHCP client may receive an address (e.g., address 118) from ISP 106. The management software may determine from the address that roaming client 134-1 is no longer connected to ISP 106. This may be because a user plugs in to a different physical address and/or a different network, or in the case in which physical interface 112 is wireless, the user may take roaming client 134-1 outside of the range of a first base station and inside the range of a second base station.

As shown in FIG. 1, gateway 124 permits application 132 within roaming client 134-1 to use virtual interface 114 through address 148 (i.e., Av) to communicate with network elements (e.g., server 156) within enterprise site 150. If physical address 118 (i.e., Aw) is lost, and roaming client 134-1 becomes resident client 134-2 at enterprise site 150, resident 134-2 will receive a physical address 146 that "belongs to" enterprise site 150. At this point, resident client 134-2 realizes that it has a physical corporate address, which may occur through several techniques including but not limited to the client referencing address tables to determine whether its address is a corporate address, by referencing a list of valid subnets, by receiving a DHCP lease that has a data field with a corporate address, or otherwise. In addition, gateway 124 (i.e., Gi) may determine that address 118 (i.e., Aw) is no longer valid and that address 146 (i.e., Ai) should be used for traffic local to enterprise site 150.

Once resident client 134-2 knows that it is on an internal corporate network (e.g., a LAN) at enterprise site 150, it may communicate with server 156, for example, without having to send packets through gateway 124 (i.e., Gi). This is because server 156 and resident client 134-2 are within the same protected subnet. Once resident client 134-2 figures out that it is local to enterprise site 150, it may inform other network components of its local, secure status. For example, resident client 134-2 may inform gateway 124 that it wants to use virtual address 148 on the physical interface 142. If gateway 124 agrees and all of the proper handshakes and authentications occur as discussed above, the address 148 (i.e., Av) exists both on virtual interface 140 and physical interface 142 within resident client 134-2. Furthermore, physical interface 142 has two valid IP addresses, specifically address 146 (i.e., Ai), and address 148 (i.e., Av). Address 146 likely would have been received from a DHCP server on enterprise site 150 and address 148 likely would have been received from gateway 124, as discussed above.

Security concerns may require that care is taken when carrying out the disclosed methods to prevent hackers from spoofing addresses and fraudulently convincing other network elements that the disclosed methods have taken place with the correct authorization, when they have not. As a security measure, resident client 134-2 may inform gateway 124 that it wishes to use address 148 (i.e., Av) on physical interface 142. If gateway 124 is aware of the corporate addresses within enterprise site 150, gateway 124 may instruct resident client 134-2 that using address 148 on physical interface 142 is permitted. As a security measure, gateway 124 may send an acknowledgment back to resident client 134-2 to address 146 (i.e., Ai). The acknowledgment would traverse router 130 and other network elements associated with enterprise site 150 to help prevent hacker clients outside of enterprise site 150 from gaining access to protected network elements. Once resident client 134-2 client receives an acknowledgment back from gateway 124, it confirms that address 146 (i.e., Ai) is a corporate address recognized by gateway 124. In response, resident client 134-2 sends a route change request (e.g., a REQ) to gateway 124. In response to gateway 124 receiving the route change request, it sends a second acknowledgment (e.g., an ACK2) to resident client 134-2 and a routing message to router 130 that tells router 130 that address 148 (i.e., Av) is available on its local network (i.e., a network at enterprise site 150). As a result, packets addressed to address 148 (i.e., Ai) go directly to enterprise site 150 rather than going to gateway 124. In this way, router 130, which may be an edge router, sends packets addressed to a virtual address (i.e., address 148) along a path that avoids the MPLS domain 126. After resident client 134-2 receives the second acknowledgement, it assigns address 148 (i.e., Av) to physical interface 142. At that point, resident client 134-2 may send packets from address 148, directly on physical interface 142, through router 130, to server 156 while avoiding MPLS domain 126 and gateway 124.

Application 132 operating within resident client 134-2 may receive traffic directly from virtual interface 140. For example, resident client 134-2 may receive traffic over virtual interface 140 while communicating with network elements at a remote site such as corporate site 104. In this case, router 108, that serves site 104, may have been communicating with roaming client 134-1, and may not be aware that roaming client 134-1 has changed its status to resident client 134-2. Further, router 108 may not be aware that any optimization has taken place in which resident client 134-2 maintains virtual addresses that it set up while it had the status of roaming client in order to maintain TCP connections. Therefore, router 108 may inefficiently send traffic through gateway 116, MPLS domain 126, gateway 124, router 130, and on to virtual interface 140. To avoid this unnecessarily long data path, gateway 124 may inform router 108 and other corporate routers (e.g., router 110, and router 136) that address 148 is locally routed. Therefore, server 104, in the above example, could traverse the MPLS domain 126 directly without going through the gateway 124 (i.e., the VPN gateway), by going from router 108 directly to router 130.

In some embodiments, VPN connections that are established with cellular networks may be migrated for a roaming client. For example, a VPN connection on a GSM (Global System for Mobile communications) network may be migrated to a WiFi network, if a user on a train (using the GSM network) receives a better connection at a coffee shop (that hosts the WiFi network). Ideally, the user's client would migrate its VPN connection from one gateway to another, and if a broadcast mechanism were available, other routers may be informed regarding the new path to the user's virtual address. Accordingly, the user's client VPN tunnels may be migrated from a cellular gateway to another gateway (not in the cellular network), and this migration may make more efficient use of network resources.

Figure 2:
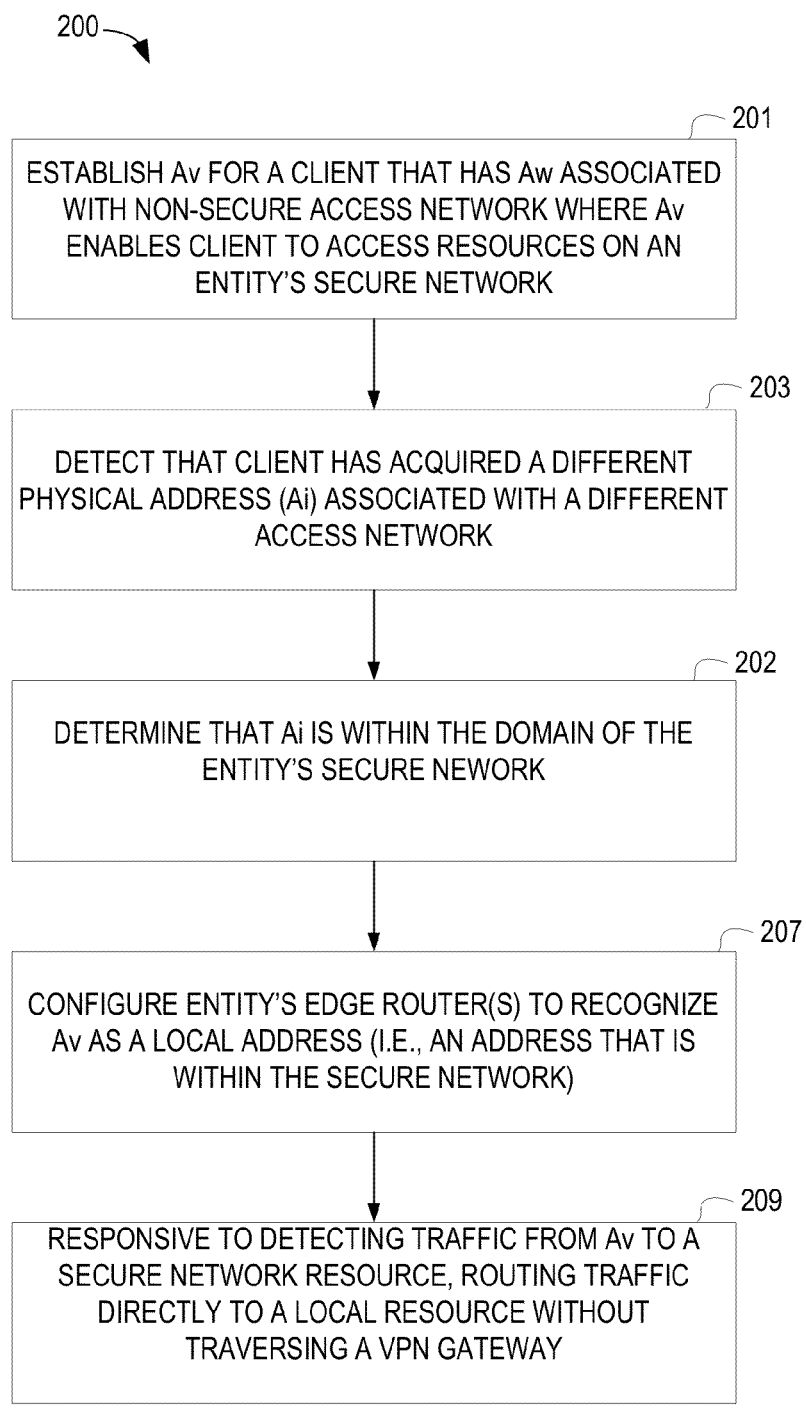
FIG. 2 depicts selected elements of a methodology for promoting efficient and seamless data networking by detecting when a roaming client becomes a resident client and routing traffic addressed to and from a virtual address so it avoids VPN gateways.

Referring now to FIG. 2, selected elements of methodology 200 provide seamless data networking in accordance with disclosed embodiments. Methodology 200 includes establishing (block 201) a virtual address (i.e., Av) for a client that has a physical address (i.e., Aw) associated with a non-secure access network. For example, as shown in FIG. 1, ISP 106 is a non-secure access network and roaming client 134-1 is assigned a virtual address 148 (i.e., Av). In some embodiments, as shown in FIG. 1, roaming client 134-1 is assigned the virtual address 148 by gateway 124, which is a VPN gateway. This enables roaming client 134-1 to access resources (e.g., server 156) at enterprise site 150, which includes a secure network. Referring again to FIG. 2, methodology 200 further includes detecting (block 203) that the client has acquired a different physical address (e.g., Ai) associated with a different access network. For example, as shown in FIG. 1, roaming client 134-1 changes its status to resident client 134-2 by obtaining physical address 146 (i.e., Ai) associated with enterprise site 150, which includes a further access network. Detecting that the client has acquired a different physical address (e.g., Ai) may be performed by a VPN gateway (e.g., gateway 124, in FIG. 1).

As shown in FIG. 2, methodology 200 further includes determining (block 202) that the physical address (e.g., Ai) for the resident client (e.g., resident client 134-2 in FIG. 2) is within the domain of the entity's secure network (e.g., within enterprise site 150). In response, the entity's edge router(s) (e.g., router 130 in FIG. 1) are configured (block 207) to recognize the virtual address (i.e., Av) as a local address, which is an address that is within the secure network. This configuration of the entity's edge router(s) may be performed by a VPN gateway (e.g., gateway 124 in FIG. 1) informing the edge router(s) (e.g., router 130) that traffic destined for the virtual address (i.e., Av) should avoid an MPLS domain (e.g., MPLS domain 126 in FIG. 1). As shown in FIG. 2, methodology 200 further includes routing (block 209) traffic directly to a local resource without traversing a VPN gateway. As shown in FIG. 1, this operation may be enabled by router 130 directing local traffic to and/or from application 132 within resident client 134-2 without the traffic being processed by gateway 124 (i.e., Gi). In this way, methodology 200 promotes efficient routing of traffic to and from an application (e.g., application 132) when a client alternates its status between resident client and roaming client without the necessity of tearing down and reestablishing TCP connections. Efficiency in the routing of such traffic is achieved in part by avoiding hairpin turns by local traffic by instructing edge routers for an enterprise site to direct local traffic directly to a local physical address while avoiding sending the traffic over VPN gateways previously established while a client was a roaming client.

Figure 3:
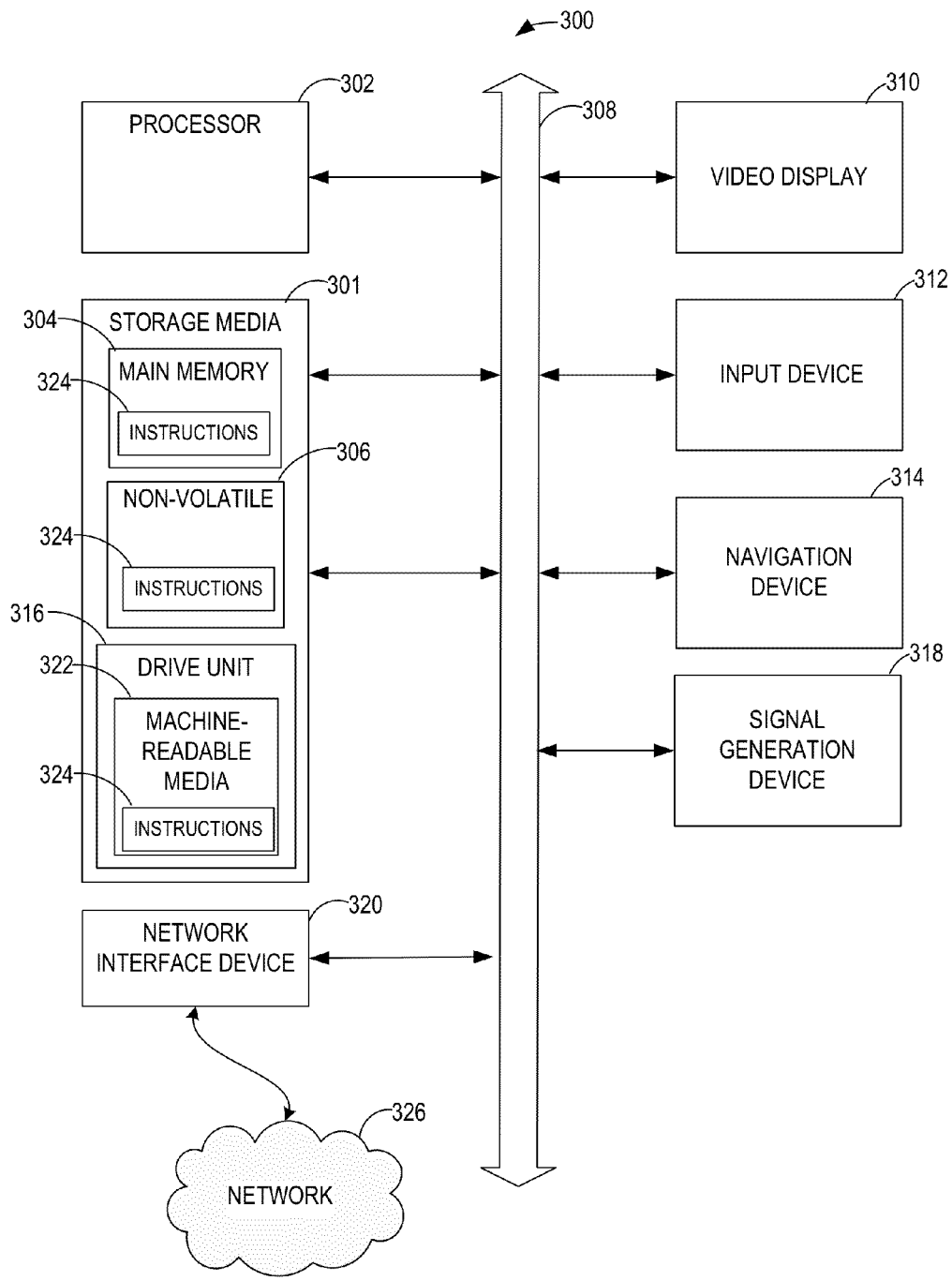
FIG. 3 illustrates a data processing system for use with disclosed embodiments to promote seamless data networking in accordance with disclosed embodiments.

FIG. 3 illustrates, in block diagram form, selected elements of an embodiment of a data processing system 300 within which a set of instructions operates to perform the methodologies discussed herein. Data processing system 300 may operate as a standalone device or may be connected (e.g., networked) to other data processing systems. In a networked deployment, data processing system 300 may operate in the capacity of a server or a client data processing system in a server-client network environment, or as a peer computer in a peer-to-peer (or distributed) network environment. Example data processing systems include, but are not limited to a personal computer (PC), a tablet PC, a personal data assistant, a cellular telephone, a smart phone, a web appliance, a network router, a switch, a bridge, a server, or any machine capable of executing a set of instructions (sequential or otherwise) that specify actions to be taken by that machine. Further, while only a single data processing system is illustrated, the term "data processing system" shall also be taken to include any collection of data processing systems that individually or jointly execute a set (or multiple sets) of instructions to perform any one or more of the methodologies discussed herein.

As shown in FIG. 3, data processing system 300 includes a processor 302 (e.g., a central processing unit, a graphics processing unit, or both) and storage media 301 that includes a main memory 304 and a non-volatile memory 306. Disk drive unit 316 and other components of storage media 301 communicate with processor 302 via bus 308. Disk drive unit 316 may include a magnetic or solid state machine-readable medium 322 that may have stored thereon one or more sets of instructions 324 and data structures (not depicted) embodying or utilized by any one or more of the methodologies or functions described herein. The instructions 324 may also reside, completely or at least partially, within the main memory 304, and within non-volatile memory 306, during execution thereof by the data processing system 300. Data processing system 300 may further include a video display unit 310 (e.g., a television, a liquid crystal display or a cathode ray tube). Data processing system 300 also includes input device 312 (e.g., a keyboard), navigation device 314 (e.g., a mouse), signal generation device 318 (e.g., a speaker) and network interface device 320. Input device 312 and/or navigation device 314 may include processors (not shown), and further memory (not shown).

Instructions 324 may be transmitted or received over a network 326 via network interface device 320 using any one of a number of transfer protocols. While the machine-readable medium 322 is depicted as a single medium, the term "machine-readable medium" should be construed as including a single medium or multiple media (e.g., a centralized or distributed database, and/or associated caches and servers) that may store all or part of instructions 324. The term "machine-readable medium" should also be taken to include any medium that is capable of storing, encoding, or carrying a set of instructions (e.g., instructions 324) for execution by a machine (e.g., data processing system 300) and that cause the machine to perform any one or more of the methodologies or that is capable of storing, encoding, or carrying data structures utilized by or associated with such a set of instructions. The term "machine-readable medium" accordingly should be taken to include, but not be limited to, solid-state memories, optical media, and magnetic media.

In accordance with some disclosed embodiments, data processing system 300 is configured as a gateway (e.g., a VPN gateway) that promotes efficient routing of traffic to and from a client that alternates its status between roaming client and resident client. Accordingly, instructions 324 establish a virtual interface and a corresponding virtual address for a client having a first physical interface and a first physical address associated with a non-secure access network. The virtual interface enables the client to access resources on an entity's secure network via an entity edge router. Further instructions 324 detect that the client has a second physical interface and a corresponding second physical address associated with a second access network. Responsive to determining that the second physical address comprises a secure address within the secure network, further instructions 324 inform the entity edge router to recognize the virtual address as a local address. Network traffic originating from the virtual address is routed to avoid the gateway while the second physical address remains valid. Accordingly, disclosed embodiments permit clients to maintain seamless, secure IP connectivity that uses site access bandwidth efficiently. Ideally, corporate network infrastructures are not impacted, while VPN gateways and access routers are reconfigured to prevent traffic from using inefficient hairpin turns.

While the disclosed subject matter has been described in connection with one or more embodiments, the disclosed embodiments are not intended to limit the subject matter of the claims to the particular forms set forth. On the contrary, disclosed embodiments are intended to encompass alternatives, modifications and equivalents.

What is claimed is:

1. A method comprising:
    establishing a virtual address for a client associated with a non-secure access network;
    establishing a virtual interface, associated with the virtual address, enabling the client to access a secure network from the non-secure access network via a virtual private network gateway;
    responsive to the client detecting a second access network, determining whether a second physical address associated with the second access network is a secure address within the secure network; and
    responsive to determining that the second physical address is the secure address within the secure network, associating the second physical address and the virtual address with a second physical interface associated with an edge router, wherein a portion of network traffic associated with the virtual address is routed via the second physical interface and the edge router rather than the virtual interface and the virtual private network gateway.

2. The method of claim 1, further comprising routing network traffic addressed to the virtual address to the second physical interface instead of to the virtual private network gateway while the second physical address remains valid.

3. The method of claim 1, further comprising detecting a termination of a connection with the non-secure access network.

4. The method of claim 1, further comprising comparing the second physical address to a plurality of known addresses for the secure network.

5. The method of claim 1, further comprising informing the virtual private network gateway that the second physical address is the secure address within the secure network.

6. The method of claim 1, further comprising routing the network traffic originating from the virtual address to a destination within the secure network.

7. The method of claim 1, wherein determining that the second physical address is the secure address further comprises receiving an indication from the virtual private network gateway.

8. A gateway, comprising:
    a processor; and
    a memory storing instructions which when executed cause the processor to perform operations, the operations comprising:
    establishing a virtual interface and a virtual address for a client associated with a non-secure access network, the virtual interface enabling the client to access resources on a secure network via the gateway;
    detecting a second access network associated with the client; and
    responsive to determining that a second physical address associated with the second access network comprises a secure address within the secure network, requesting an edge router of the second access network to route network traffic corresponding to the virtual address via the second access network rather than the gateway.

9. The gateway of claim 8, wherein the operations include informing a plurality of corporate sites that the second physical address comprises the secure address.

10. The gateway of claim 8, wherein the operations further comprise requesting the edge router to route the network traffic via the second access network while the second physical address remains valid.

11. The gateway of claim 8, wherein the operations further comprise tunneling through a multiprotocol label switching network.

12. The gateway of claim 8, wherein the operations further comprise receiving an indication from the edge router that the virtual address for the client having the first physical interface is a local address within the secure network.

13. The gateway of claim 8, wherein the operations further comprise associating a second physical interface with the second physical address as well as the virtual address.

14. The gateway of claim 8, wherein the operations further comprise comparing an assertion of valid corporate address contained in a dynamic host configuration protocol lease for the client to a plurality of known addresses for the secure network.

15. The gateway of claim 8, wherein the operations further comprise determining a source subnet for a dynamic host protocol lease for the client.

16. A memory storing instructions which when executed cause processor to perform operations, the operations comprising:
    establishing a virtual interface and a virtual address for a client having a first physical interface and a first physical address associated with a client connection to a non-secure access network, wherein the virtual interface enables the client to access a secure network via a virtual private network gateway;
    responsive to detecting a second physical interface and a corresponding second physical address associated with another client connection to a second access network, determining whether the second physical address comprises a secure address within the secure network; and responsive to determining that the second physical address is the secure address, associating the second physical address and the virtual address with the second physical interface to route network traffic corresponding to the virtual address via the second physical interface instead of via the virtual private network gateway.

17. The memory of claim 16, wherein the operations further comprise sending a packet addressed to the virtual address to avoid the virtual private network gateway.

18. The memory of claim 16, wherein the operations further comprise establishing a tunnel through a multiprotocol label switching domain between the client and the secure network.

\* \* \* \* \*